United States Patent
Shih

[19]

[11] Patent Number: 5,813,778
[45] Date of Patent: Sep. 29, 1998

[54] KEY UNDERBOARD STRUCTURE OF COMPUTER KEYBOARD

[75] Inventor: Ma-Jung Shih, Taipei Hsien, Taiwan

[73] Assignee: Behavior Tech Computer Corp., Taiwan

[21] Appl. No.: 827,304

[22] Filed: Mar. 28, 1997

[51] Int. Cl.[6] ....................................................... B41J 5/16
[52] U.S. Cl. ........................................... 400/496; 400/473
[58] Field of Search ................................... 400/496, 473, 400/472; 361/680, 679; 200/5 R; 235/145 R; 248/220.21, 220.22

[56] References Cited

U.S. PATENT DOCUMENTS

| | | | |
|---|---|---|---|
| 3,982,081 | 9/1976 | Demler | 361/680 |
| 5,535,091 | 7/1996 | Lee | 248/220.21 |
| 5,608,603 | 3/1997 | Su | 361/680 |
| 5,625,532 | 4/1997 | Seller | 361/680 |

*Primary Examiner*—Edgar S. Burr
*Assistant Examiner*—Anthony H. Nguyen
*Attorney, Agent, or Firm*—Ostrolenk, Faber, Gerb & Soffen, LLP

[57] ABSTRACT

A key underboard structure adapted to be used in a computer key board assembly having a plurality of movable keys, includes a lower board and an upper board connected together by means of bayonet engagement to sandwich therebetween a rubber pad with an electrical circuit board having a plurality of contacts corresponding to the keys interposed between the rubber pad the lower board. The rubber pad having a plurality of resilient caps received and extending through holes formed on the upper board and to each contain therein a contact pad. A driving device is constituted by a first member having one end pivoted to the upper board to overlap a second member which has an opposite end movably and rotatably received within an L-shaped member formed on the upper board. The second member has an opening to allow the first member to extend therethrough and define a pivotal connection therebetween so as to allow the driving device to be movable between an expanded, cross configuration condition to rest on the cap and a collapsed, overlapped configuration condition so that when the key is depressed, the driving device changes from the expanded condition to the collapsed condition to deform the cap from an un-deformed configuration to a depressed configuration to bring the contact pad disposed therein into contact with the associated contact of the circuit board.

8 Claims, 4 Drawing Sheets

KEY UNDERBOARD STRUCTURE OF COMPUTER KEYBOARD

FIELD OF THE INVENTION

The present invention relates generally to a computer keyboard and in particular to a key underboard structure of the computer keyboard.

BACKGROUND OF THE INVENTION

The term "key underboard" used herein is referred to a multi-layer board for sandwiching and holding an electrical board under the keys of the keyboard assembly so as to allow the establish of electrical connection between the key depressed and the electrical circuit board to trigger a signal indicating the key depressed. Conventionally the key underboard used in a computer keyboard assembly comprises a lower board an upper board fixed to each other with a rubber pad sandwich therebetween to define the multi-layer structure. The electrical circuit is disposed under and protected and insulated by the rubber pad. To provide the underboard with sufficient mechanical strength, the lower board is usually made of metal plate, while the upper board is a plastic plate (which is also referred to as holed board) having a plurality of holes corresponding to the keys of the keyboard formed thereon. The circuit board that is disposed between the lower board and the rubber pad comprises a plurality of electrical contact. The rubber pad comprises a plurality of raised cones or caps each having a contact pad located therein and a spring disposed thereabove. The upper board is disposed on the lower board with the raised caps extending through the holes formed thereon. A key piece is then mounted on each of the raised caps and biased by a spring. These members are assembled so that depressing the key piece deforms the cap of the rubber pad to drive the contact pad to get into contact with the contact of the electrical circuit to generate the signal indicate the key depressed. The spring serves as returning means to return the key piece back to original position.

FIG. 5 illustrates a prior art keyboard assembly, in which the lower board A is provided with a plurality of apertures A1 and the upper board B is provided with corresponding screw holes B1 so that the rubber pad D is securely sandwiched between the upper board B and the lower board A by means of screws C which extends through the apertures A1 of the lower board A and engages the screw holes B1 of the upper board B with the electric circuit board E sandwich between the rubber pad D and the lower board A. In the prior art design, there are a number of screw holes B1 into which a number of screws C have to be tightened. This is quite time-consuming and thus reduces the assembly efficiency. Further, if any one of the holes B1 or apertures A1 is not made at the correctly position, mis-alignment between the upper and lower boards may occur.

FIG. 6 shows another prior art design of the keyboard assembly wherein the lower board A is provided with a plurality of hooks or catches A2 to engage or catch slots B2 formed on the upper board B so as to secure the upper board B and lower board A together to sandwich the rubber pad D therebetween. Several screw holes may be provided to fix the upper board B and lower board A together with screws. The number of the screw holes in this design is much less than that of the prior art shown in FIG. 5. The engagement between the hook A2 and the associated slot B2 also requires manufacturing precision so that the manufacturing tolerance is also very severe. Moreover, the hooks A2 are formed by pressing on the metal lower board A so that the hooks A2 do not have large rigidity in resisting external force and thus easy to be distorted or deformed. This influences the precision and causes problem in mounting the lower board A to the upper board B particularly.

In addition, both the designs shown in FIGS. 5 and 6 comprise a plastic upper board and a metal lower board which have different thermal expansion coefficients so that when the keyboard assembly is subject to temperature change, the key underboard that is constructed by fixedly securing the lower board to the upper board would undergo distortion which in turn deteriorates the mounting precision therebetween, causing problem in getting the contact pad into contact engagement with the contact on the circuit board.

It is thus desirable to provide a key underboard structure of computer keyboard assembly which overcomes the above problems and drawbacks.

SUMMARY OF THE INVENTION

The principal object of the present invention is to provide a key underboard structure of the above-discussed type wherein the lower board and the upper board are secured by means of bayonet type connection which allow ready connection between the lower board and the upper board and also accommodate small relative movement between the boards caused by different thermal expansion.

Another object of the present invention is to provide a driving device to be disposed between each of the keys of the keyboard and the associated cap of the rubber pad which is constituted by two separated members respectively pivoted to and movably and rotatably mounted on the upper board, one of the two members having an opening to receive the other one extending therethrough and defining a pivotal connection in a cross configuration therebetween so as to allow the two member to be relatively rotatably with respect to each other for accommodation of the relative deformation between the keys and the underboard when subject to external force.

Thus, in accordance with the present invention, there is provided a key underboard structure adapted to be used in a computer key board assembly having a plurality of movable keys, comprising a lower board and an upper board connected together by means of bayonet engagement to sandwich therebetween a rubber pad with an electrical circuit board having a plurality of contacts corresponding to the keys interposed between the rubber pad the lower board. The rubber pad having a plurality of resilient caps received and extending through holes formed on the upper board and to each contain therein a contact pad. A driving device is constituted by a first member having one end pivoted to the upper board to overlap a second member which has an opposite end movably and rotatably received within an L-shaped member formed on the upper board. The second member has an opening to allow the first member to extend therethrough and define a pivotal connection therebetween so as to allow the driving device to be movable between an expanded, cross configuration condition to rest on the cap and a collapsed, overlapped configuration condition so that when the key is depressed, the driving device changes from the expanded condition to the collapsed condition to deform the cap from an un-deformed configuration to a depressed configuration to bring the contact pad disposed therein into contact with the associated contact of the circuit board.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
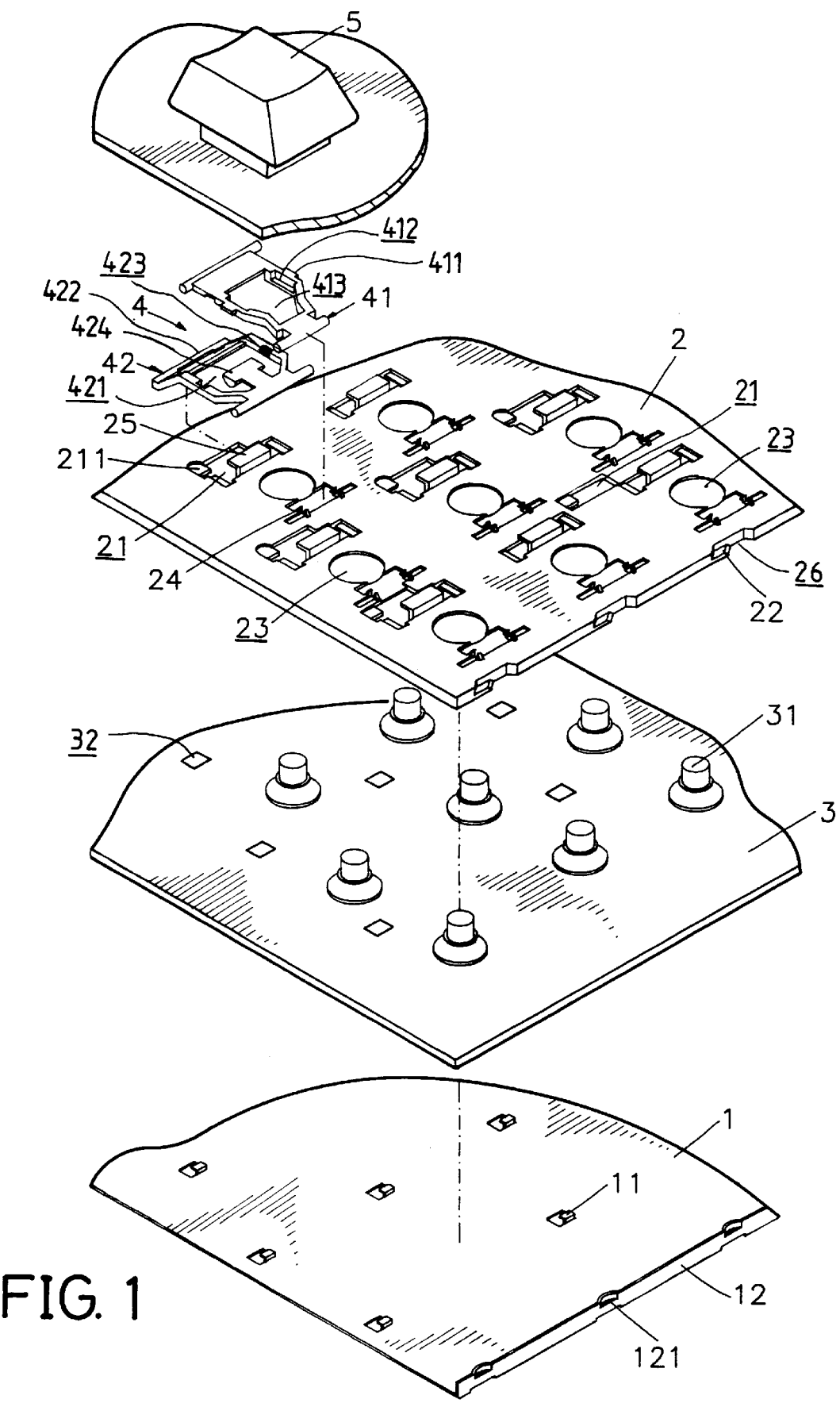
FIG. 1 is an exploded perspective view of a portion of the keyboard assembly constructed in accordance with the present invention.

With reference to the drawings and in particular to FIG. 1, wherein a keyboard assembly with a key underboard in accordance with the present invention is shown, the keyboard assembly comprises a plurality of keys 5 (only one being shown for clarity) movably mounted in a casing (not shown) and a key underboard constructed in accordance with the present invention disposed under the keys 5. The key underboard comprises a lower board 1 and an upper board 2 with a rubber pad 3 interposed therebetween.

An electric circuit board, although not shown in FIGS. 1–4, yet is known from the description of the related prior art to be disposed on the lower board 1 and interposed between the lower board 1 and the rubber pad 3. This is similar to the prior art designs and no further description is needed. As discussed above in association with the prior art structures, the electric circuit board has a plurality of the contacts, each corresponding to one of the keys 5.

The lower board 1 is made of a material of a suitable rigidity, preferably a metal plate, such as a steel plate, and comprises a plurality of L-shaped hooks 11 formed by means of pressing on the metal board 1. The hooks 11 all face the same direction. The lower board 1 is also provided on an edge with an edge flange 12 which is preferably substantially normal to the lower board 1 and having a plurality of inward projections 121. Alternatively, the provision of the edge flange 12 and the projections 121 may be found on the opposite edge or on both edges, but not necessarily. In case that the projections 121 are provided on both edges, the projections 121 may be symmetrical with respect to and aligned with each other, or the projections 121 on the two edges may be offset from or alternate each other along the direction of the edge.

The upper board 2 has formed on an edge a plurality of recesses 26 each associated with each of the projections 121 of the lower board 1 to receive the projection 121 therein (FIG. 3) and having a support deck 22 to engage the projection 121 (FIG. 4) by means of relative movement therebetween so as to define a bayonet connection between the support deck 22 and the projection 121 which secures the lower board 1 to the upper board 2. The opposite edge of the upper board 2 may also be provided with such recesses and support decks, if the edge flange and projections are found on the opposite edge of the lower board 1. Such a bayonet connection is well known and no further description is needed herein.

The rubber pad 3 comprises a plurality of raised caps 31 integrally formed thereon. The caps 31 are shaped to be resilient so that they are deformable upon depression and capable to restore the initial shape once the depression is released. As is discussed in the prior art structures, each of the resilient caps 31 comprises a contact pad (not shown) fixed therein and corresponding to each of the contacts of the electric circuit board so that the contact pad is normally separated from the corresponding contact of the circuit board and is brought into contact engagement with the contact when the cap 31 is depressed.

The rubber pad 3 also has a plurality of openings 32 corresponding to the hooks 11 so as to allow the hooks 11 to extend therethrough.

The upper board 2 is preferably made of plastic material, but not necessarily to be so, has a plurality of openings 21 formed thereon, corresponding to the hooks 11 of the lower board 1 to allow the hooks 11 to extend therethrough (FIG. 3) and having a support deck 211 formed therein to receive and engage the respective hook 11 (FIG. 4) by means of relative movement between the upper and lower boards 2 and 1 so as to define a bayonet engagement therebetween which cooperates with the bayonet connections defined by the edge projections 121 of the lower board 1 and the edge recesses 26 and associated support decks 22 of the upper board 2 serves to securely hold the lower board 1 to the upper board 2. To allow the formation of the bayonet engagement, the openings 21 of the upper board 2 and the openings 32 of the rubber pad 3 should be large enough to accommodate the relative movement between the upper board 2 and the lower board 1.

The upper board 2 is also provided with a plurality of through holes 23 through which the raised caps 31 of the rubber pad 3 extend. Each of the through holes 23 is provided with means 4 for driving the contact pad disposed inside the cap 31 that is received in the hole 23 to contact the associated contact of the electric circuit board when the respective key 5 is actuated.

The driving means 4 comprises a first member 41 and a second member 42, both of a substantially flat plate configuration with an end inclination and an opposite flat end. The inclinations of the two members 41 and 42 are arranged to be opposite to each other and defines a height (that is the distance between the substantially flat portion and the remote end of the inclination) large enough to accommodate the thickness of the members 41 and 42 so that the members 41 and 42 may be stacked over or overlapping each other.

The first member 41 has a pivot shaft 410 formed on the remote end of the inclination and is rotatably received and held within pivot holder means 24 to allow the first member 41 to be rotatable relative to the upper board 2 and to have the flat portion thereof extend over and rest on the cap 31.

The upper board 2 has an L-shaped member 25 formed thereon, corresponding to and facing away from each of the holes 23 and located at the side of the hole 23 opposite to the pivot holder 24 to receive a straight and flat end rim 422 of the second member 42 therein. The L-shaped member 25 is sized to allow the second member 2 to movable relative thereto along the plane of the upper board 2 and also accommodate rotation of the end rim 422 relative thereto.

Figure 2:
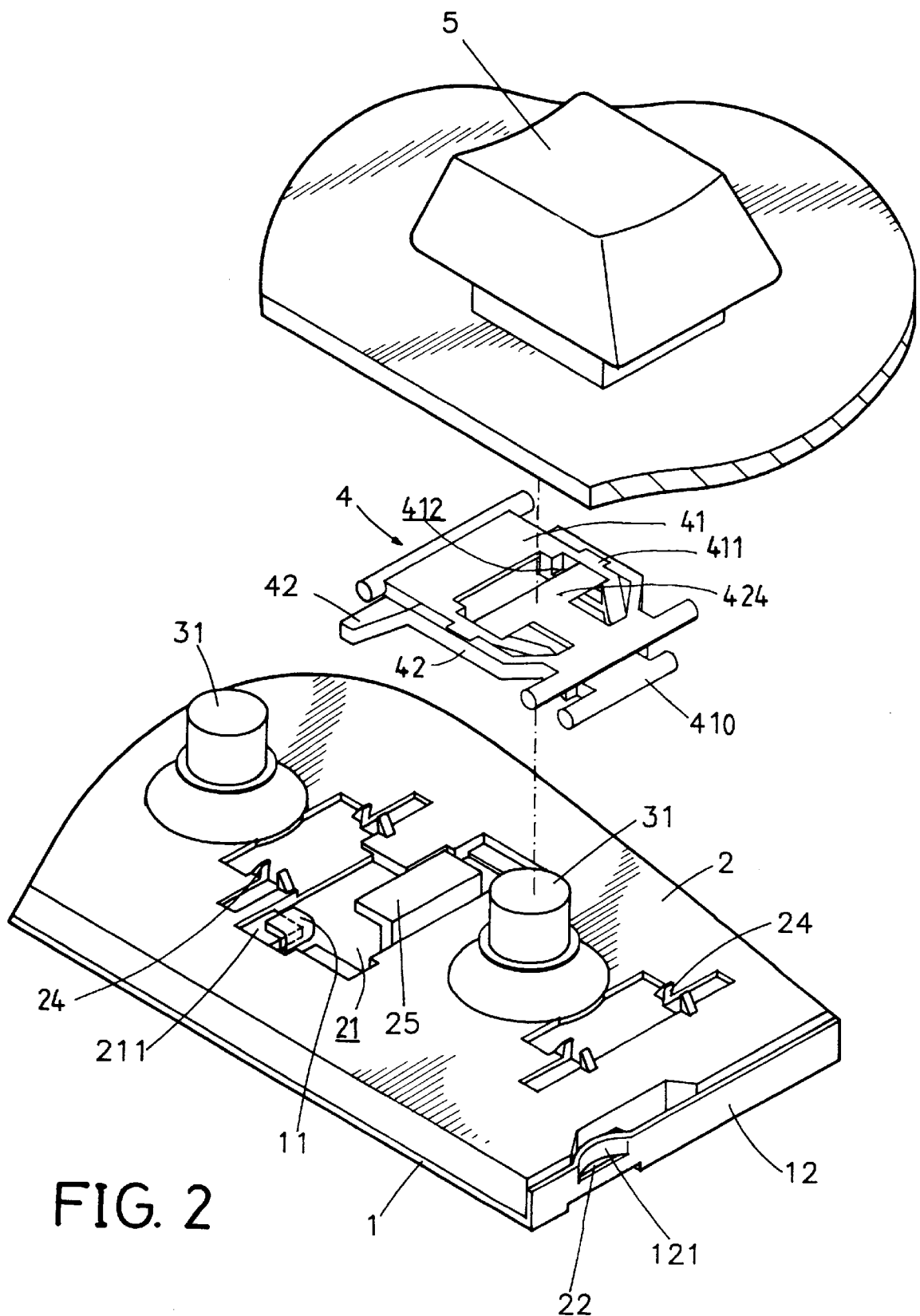
FIG. 2 is an enlarged exploded perspective view showing the portion of the keyboard assembly of the present invention with the upper board and the lower board secured together and forming the key underboard.
Figure 3:
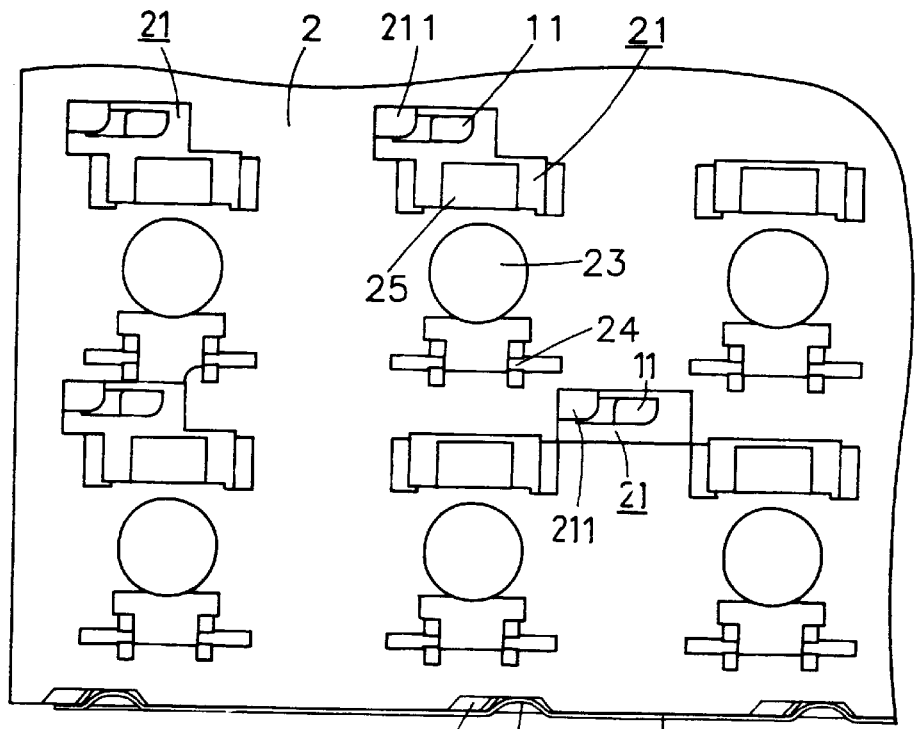
FIGS. 3 and 4 are top plan views respectively showing the relationship between the upper board and lower board before and after they are secured together.
Figure 4:
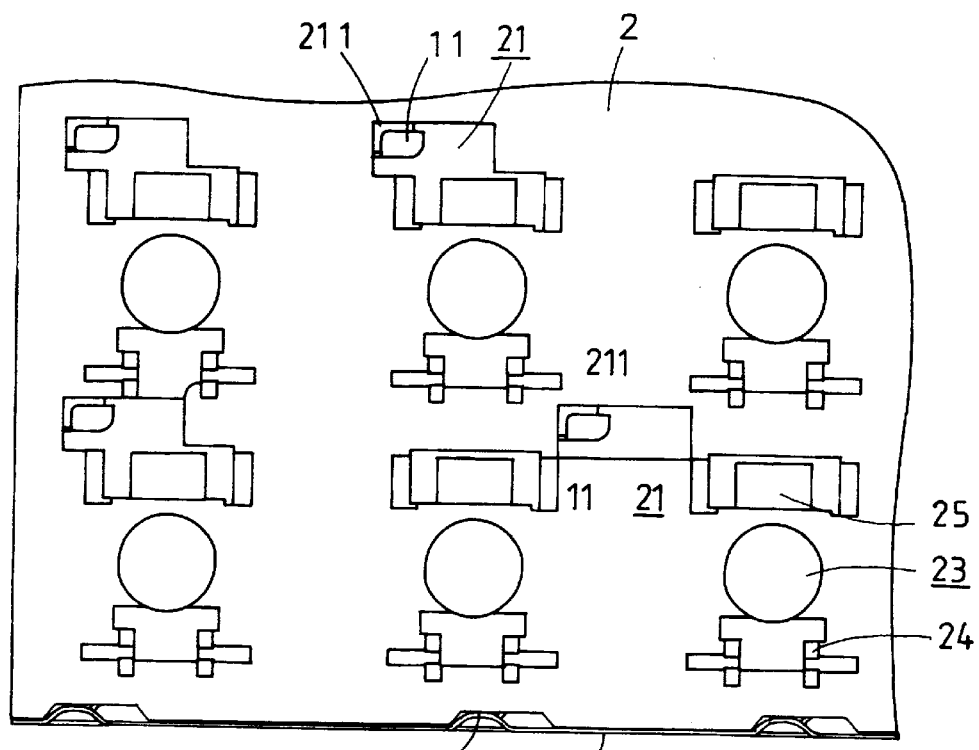
Figure 5:
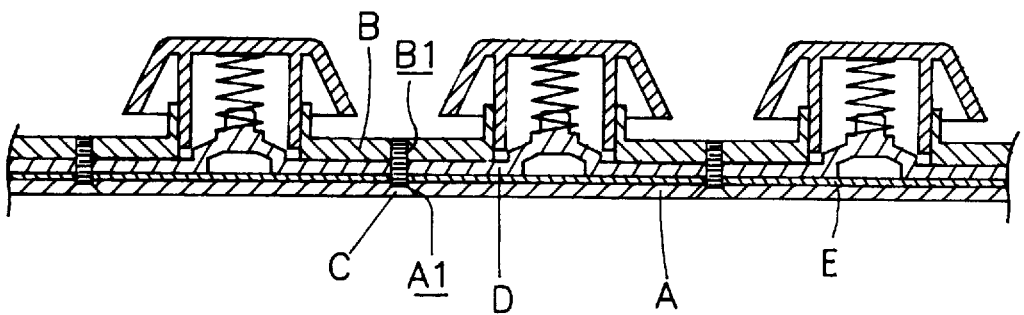
FIG. 5 and 6 are cross-sectional views showing prior art keyboard assembly structures.
Figure 6:
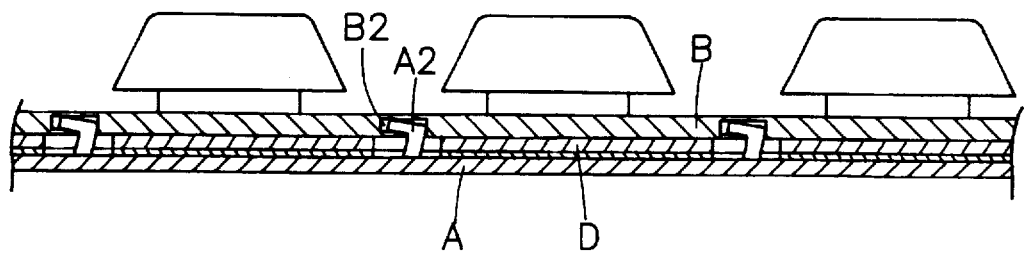

The flat end of the first member 41 extends through an opening 421 formed on the second member 42 and overlap thereon (see FIG. 2). The opening 421 of the second member 42 is sized and configured so as to, in cooperation with pivotal connection of the first member 41 to the upper board 2 and the movable and rotatable engagement between the second member 42 and the upper board 2, allow the first and second members 41 and 42 to rotate with respect to each other and define a cross configuration to be supported on the cap 31 of the rubber pad 3.

Preferably, the first member 41 is provided with two opposite side lugs 411 which are movably received within corresponding notches 423 formed on the two sides of the opening 421 of the second member 42 to define a pivotal connection therebetween. More preferably, the second member 42 is provided with a T-shaped projection 424 extending into the opening 421 to be received within slot 412 formed on the first member 41. The slot 412 has such a width defined between two opposite sides that when the relative rotation between the first and second members 41 and 42 reaches a predetermined cross condition, the T-shaped projection 424 is brought into contact with one of the sides of the slot 412 and thus limiting further relative rotation. Preferably, the first member 41 is also provided with an opening 413 to accommodate the T-shaped projection 424 therein with the slot 412 defined by two recesses respectively formed on two sides of the opening 413 at locations substantially corresponding to the side lugs 411 so as also to serve as the pivot of the relative rotation between the first and second members 41 and 42.

The relative rotation between the first and second members 41 and 42 allows the driving member 4 to be movable between an expanded, cross configuration position and a collapsed, substantially overlapped configuration position. Such a movement of the driving means 4 drives the cap 31 that is located thereunder and resiliently deformable to move between a deformed position where the contact pad disposed therein is brought to contact the electric circuit board and a released position where the cap 31 resumes its un-deformed configuration and the contact pad is separated from the electric circuit board.

The movable and non-secured configuration of the driving means 4 allows it to accommodate any deformation caused by external impact or temperature change so as to provide a more precise operation of the key 5. Also the bayonet connection between the upper board 2 and the lower board 1 allows the key underboard to be constructed in a very simple manner which certainly reduces the cost needed in manufacturing and also help to accommodate deformation between the key and the underboard.

Although a preferred embodiment has been described to illustrate the present invention, it is apparent that changes and modifications in the specifically described embodiment can be carried out without departing from the scope of the invention which is intended to be limited only by the appended claims.

What is claimed is:

1. A key underboard structure adapted to be used in a computer key board assembly having a plurality of movable keys, the key underboard comprising:

a lower board adapted to support thereon an electric circuit board having a plurality of contacts corresponding to the keys, the lower board having a plurality of hooks provided thereon;

a rubber pad having a plurality of raised caps integrally formed thereon, each cap being adapted to receive and hold therein a contact pad, and each cap having a resiliency so as to be depressible to elastically deform and to resume an original configuration after the depression is released, the rubber pad being placeable on an electric circuit board on the lower board, the rubber pad having a plurality of first openings therein corresponding in location to the hooks of the lower board and each first opening sized to allow the respective hook in each first opening to move relative to the rubber pad in a direction on parallel with the rubber pad;

an upper board being placed above the rubber pad, the upper board having a plurality of second openings corresponding in location to the hooks of the lower board to receive the hooks to extend through the second openings, a respective support deck on the upper board provided in each second opening, the second openings being sized to allow the hooks to move relative to the upper board in a direction parallel with the upper board to be received over and supported on the respective support deck provided in each second opening for defining a bayonet engagement between the upper and lower boards for securely sandwiching the rubber pad and the electric circuit board between the upper board and the lower board, the upper board further comprising a plurality of through holes corresponding in location to and receiving the raised caps therein;

driving means disposed between each of the raised caps and the respective key, the driving means comprising a first member and a second member, both having a substantially flat portion, the first member having a first end pivoted to the upper board and having a second end, the second member having a third opening therethrough, and also having a third end which is movably and rotatably mounted on the upper board, the first end of the first member and the third end of the second member being so placed and spaced apart on the upper board that the first and second members have a collapsed overlapped condition wherein the second member is then above the first member and the second end of the first member extends through the third opening in the second member, and the first member being pivotally connected to the second member in the third opening for allowing the first member and the second member to be rotatable with respect to each other, about the pivotal connection between the first and second members, between an expanded, cross configuration condition resting on and supported by the raised cap beneath the first member and a collapsed, overlapped configuration condition depressing the key so that when the key is depressed, the driving means changes from the expanded condition to the collapsed condition to deform the cap from the original configuration to a depressed configuration to bring the contact pad disposed therein into contact with the associated contact of the circuit board.

2. The key underboard structure as claimed in claim 1, further comprising a respective pivot holder formed on the upper board and associated with each of the second openings, wherein the first end of the first member of the driving means comprises a pivot mounted to be received and rotatably held in the respective pivot holder formed on the upper board.

3. The key underboard structure as claimed in claim 1, wherein the second member of the driving means comprises a flat and straight rim and wherein the upper board comprises a respective L-shaped member mounted and extending up from the upper board at each of the second openings, the L-shaped member projecting opposite the respective pivot holder at each second opening, the L-shaped member being arranged to face away from the respective second opening and sized to receive the flat and straight rim of the respective second member in the L-shaped member in a movable and rotatable manner.

4. The key underboard structure as claimed in claim 1, wherein the first member of the driving means comprises two side lugs, the second member has sides defining the third opening of the second member; the sides of the third opening having notches formed therein, the side lugs of the first member being rotatably received within the notches formed in the sides of the third opening to define the pivotal connection between the first and second driving members.

5. The key underboard structure as claimed in claim 4, wherein the first member has a slot formed therein, the second member comprises a T-shaped projection extending over the third opening thereof to be movably received within the slot formed in the first member, the slot having a side to which the T-shaped projection is brought into contact when the driving means is moved to the expanded, cross configuration condition.

6. The key underboard structure as claimed in claim 5, wherein the first member comprises a fourth opening having two sides each of the two sides is formed to be opposite to a respective one of the side lugs, each side of the fourth opening has a respective one of the slots which respectively receive a lateral end of the T-shaped projection therein in a rotatable manner so as to, together with the side lugs and the slots, define the pivotal connection between the first and second members.

7. The key underboard structure as claimed in claim 1, wherein the lower board has at least one side with a flange substantially normal to the one side, the flange including a plurality of inward projections formed therein, and the upper board has at least one side corresponding to the at least one side of the lower board, the upper board one side being formed with a plurality of recesses corresponding to the inward projections of the lower board, each of the recesses having a support deck formed therein to form a bayonet connection with the respective inward projection.

8. The key underboard structure as claimed in claim 7, wherein the lower board comprises a respective flange along two opposite sides, each flange having a plurality of the inward projections facing each other, respective recesses formed on two opposite sides of the upper board and including a support deck formed inside the respective recesses, the projections of the flanges being received within respective ones of the recesses so as to define a bayonet connection between the projections and the support decks.

\* \* \* \* \*